(12) United States Patent
Bruch

(10) Patent No.: US 7,417,542 B2
(45) Date of Patent: Aug. 26, 2008

(54) AIRCRAFT SECURITY ALARM SYSTEM

(75) Inventor: Stein Bruch, Rosemount, MN (US)

(73) Assignee: Stein H. Bruch, Rosemount, MN (US)

( * ) Notice: Subject to any disclaimer, the term of this patent is extended or adjusted under 35 U.S.C. 154(b) by 197 days.

(21) Appl. No.: 11/345,425

(22) Filed: Feb. 1, 2006

(65) Prior Publication Data

US 2007/0176793 A1 Aug. 2, 2007

(51) Int. Cl.
*G08B 13/08* (2006.01)
(52) U.S. Cl. .................. 340/545.1; 340/945; 200/61.62
(58) Field of Classification Search ... 340/545.1–545.9, 340/945; 200/61.62
See application file for complete search history.

(56) References Cited

U.S. PATENT DOCUMENTS

| 3,924,256 | A | * | 12/1975 | Cohen | 340/508 |
| 5,668,533 | A | * | 9/1997 | Jackson et al. | 340/547 |
| 5,912,619 | A | * | 6/1999 | Vogt | 340/545.1 |
| 6,124,792 | A | * | 9/2000 | Shoen et al. | 340/545.2 |
| 6,535,133 | B2 | * | 3/2003 | Gohara | 340/584 |
| 7,113,091 | B2 | * | 9/2006 | Script et al. | 340/546 |
| 7,242,297 | B2 | * | 7/2007 | Vogt | 340/547 |
| 2003/0098791 | A1 | * | 5/2003 | Carlson et al. | 340/547 |
| 2004/0257246 | A1 | * | 12/2004 | Pahl et al. | 340/945 |
| 2005/0024207 | A1 | * | 2/2005 | Schebel et al. | 340/545.2 |

* cited by examiner

*Primary Examiner*—Jeff Hofsass
*Assistant Examiner*—Edny Labbees
(74) *Attorney, Agent, or Firm*—Donald W. Meeker

(57) ABSTRACT

An aircraft security alarm system uses proximity sensors mounted in adjacent pairs to any access area into an aircraft, The proximity sensors are connected electrically to a battery-powered control box with a miniature LED remote indicator light to identify that the system is activated. When any door or cover over an access area is moved, opened, or otherwise accessed, a switch in one of the pair of proximity sensors detects the movement. The proximity sensor sends a signal to the control box, which in turn triggers a high decibel/high pitch siren/horn that sounds indefinitely until the system is disarmed via a wireless remote control.

4 Claims, 2 Drawing Sheets

AIRCRAFT SECURITY ALARM SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to security systems and particularly to a simple aircraft security alarm system comprising proximity sensors located on each side of any point of entry to the aircraft, which when moved apart from each other will signal an alarm when the system is activated; the system further comprising a main control box, a receiver associated with the controller that cooperates with a remote transmitter such as an electronic key fob carried by the user, a siren or horn, an alarm indicator light, and a power source.

2. Description of Related Art Including Information Disclosed Under 37 CFR 1.97 and 1.98

Often small aircraft are merely tied down outside in a remote location on an airfield when not in use, so as to be subject to theft not only of the aircraft instruments, but also the aircraft itself. Vandalism and theft of small aircraft kept at small airports is a growing problem. Many small airports are unattended for long periods of time, especially at night. Even the simplest small aircraft can cost several times the price of an expensive automobile to replace. Equipment in the airplane is very costly to replace if it is stolen or the airplane is vandalized.

Current aircraft security systems for the most part consist of mechanical devices such as locks, covers, plates and other items which physically bar an intruder from illegally manipulating items on or in the aircraft. It is possible for many of these devices to be broken relatively quietly and for thieves to enter the aircraft.

While many automotive type car alarms exist the application of this technology as it applies specifically to aircraft is lacking in today's market. Prior art security systems for aircraft generally do not provide adequate alarm systems to sound an alarm for a breach of the aircraft shell through any of the openings into an aircraft.

U.S. Pat. No. 5,680,095, issued Oct. 21, 1997 to Nassouri, is for a security apparatus for buildings, vehicles and the like which includes a switch mounted adjacent to a closure access member. A housing mounted adjacent to the closure access member receives a member movable between first and second positions. When the movable member is in the first position, a magnet mounted in the member is disposed in close proximity to the switch to magnetically move the switch contact to an open position. When the movable member is moved to a second position, the magnet is magnetically decoupled from the switch enabling the switch contact to close to ground completing a circuit to activating the alarm. In another embodiment, the magnet is mounted in a body. A rod extends from the body and carries a holder and a lock cylinder engagement member at another end. The lock cylinder engagement member is releasibly insertible into a lock cylinder to position the magnet adjacent to a switch mounted on the closure member. Any removal of the key lock cylinder engagement member separates the magnet from the switch causing the switch contact to close to ground activating the alarm. In another embodiment, a grounded key inserted into a lock cylinder completes a circuit through a relay coil activating the relay coil and causing a relay switch contact to open disabling the alarm. Removal of the key de-energizes the relay causing the switch contact to move to a normally closed position activating the alarm.

U.S. Pat. No. 4,797,657, issued Jan. 10, 1989 to Vorzimmer, shows a portable self-contained intrusion detector for passenger aircraft having a portable housing including on board power means, at least one sensor operable to detect activity along a detection beam alignable to the aircraft and an indicator such as a strobe light providing a flashing-light alarm visible through the aircraft windows. The detector is self-sufficient, being carryable onto the aircraft by security personnel, and there activated without exposure to possible tampering. The sensor and/or indicator are armed after a delay allowing the security personnel to depart the detection zone, and activation of the indicator is delayed following detected activity, allowing security personnel to disarm the device by entry of a code, without indicating alarm conditions.

U.S. Pat. No. 5,691,697, issued Nov. 25, 1997 to Carvalho, claims a security system that includes a pressure sensing circuit for generating an electrical signal in response to changes in pressure and a signal processing circuit, connected to receive the electrical signal, for determining whether the electrical signal represents an intrusion pattern. A pressure sensing circuit generates an electrical signal in response to changes in pressure and a trigger circuit for determining whether an intrusion has occurred by determining whether a peak of the electrical signal has an amplitude that exceeds a floating amplitude threshold, wherein the floating amplitude threshold compensates for ambient noise in the enclosed area. A monitor mode measures intrusion data in a specific enclosed area and determines security system thresholds in accordance with the measured intrusion data.

Two U.S. Pat. No. 4,933,668 issued Jun. 12, 1990 and U.S. Pat. No. 5,063,371 issued Nov. 5, 1991 to Oyer describe an aircraft security system that includes a central control unit, several remotely located cluster controllers and a plurality of intrusion sensors associated with and controlled by each cluster controller. A two-wire bus carries power from the central control unit for operating each of the cluster controllers and the sensors, and carries data signals in both directions between the central control unit and the cluster controllers. The two-wire bus reduces weight and installation costs. The system includes an initial calibration mode wherein sensor type information and sensor parameters are sent from the central control unit to each cluster controller. The signal strength from each sensor is then measured and stored in the central control unit. During later operation, the sensor signal strengths are measured and compared with the initial values. If a trouble condition is detected, appropriate corrective action is taken. One corrective action includes varying the transmitted energy until the sensor signal strength is within a prescribed range.

U.S. Pat. No. 6,633,239, issued Oct. 14, 2003 to Plude, discloses a warning indication system and method of using the same in conjunction with a cargo door of an aircraft. The cargo door is positionable in an opened position; a closed position; a closed and latched position; and a closed, latched, and locked position. The method includes outputting first and second closed signals when the cargo door is in the closed position; outputting first and second latched signals when the cargo door is in the closed and latched position; and outputting first and second locked signals when the cargo door is in the closed, latched, and locked position. All of the signals are then analyzed to positively determine the position of the cargo door, while minimizing the probability of false indications. Various warnings are generated in response to the combination of signals received. The apparatus employs a dual logic system and redundant sensors to provide differing warnings dependent on the phase of flight.

U.S. Pat. No. 5,933,098, issued Aug. 3, 1999 to Haxton, indicates an airport security system for monitoring and securing airplanes stowed at various site airports within a security network. Each of the planes is fitted with a transmitter or transmitters that transmit coded signals upon detecting an intrusion. In addition, the transmitters transmit periodic check-in signals. The signals are received by a receiver at the site airport, which conveys the coded signals to a local site main computer that, in turn, is connected to a central facility computer coupled to all of the site main computers within the network. If an alarm condition occurs or if an aircraft in the system fails to check-in at its designated time, appropriate alarms are generated and appropriate action taken. Aircraft can also be tracked by the central facility computer as they fly from one site airport to another within the network.

U.S. Pat. No. 6,067,026, issued May 23, 2000 to Weimer, concerns a sensor apparatus for the non-contact monitoring of a predetermined end position of a mechanical element, in particular a door in an aircraft, which comprises a probe, an electronic measurement means, and a control means. The probe is attached to the aircraft and samples the distance between itself and a target surface on the element to be monitored. The electronic measurement means is connected to the probe and is so constructed that in response to at least one control signal it generates a measurement signal corresponding to the distance. The control means is connected to the electronic measurement means and generates the control signals, receives measurement signals and generates an indicator signal to indicate that the end position has been detected.

U.S. Pat. No. 6,946,959, issued Sep. 20, 2005 to Wang, provides a portable wireless alarm system that includes at least two alarm devices each of which includes a signal generator for generating an action signal, wherein the alarm devices are communicatively networked with each other by means of radio frequency to contribute a security network in such a manner that, within the security network, when one of the alarm devices is triggered to generate the action signal, another alarm device is automatically triggered by the action signal to produce alert signal, so as to enlarge a coverage area of the alarm device. In addition, the alarm device is a portable wireless alarm device that is communicated with an alarm activator by means of radio frequency signal to remotely control the alarm device to be activated. Therefore, the portable wireless alarm device is capable of wirelessly setting up at a designated location with free installation to ensure the best security.

What is needed is a security device for all openings into an aircraft to protect the aircraft from security violations including theft of items either installed on/in the aircraft such as valuable engines/accessories, avionics, pilot supplies as well as personal items stored within the aircraft such as luggage, keys, wallets and other valuable items the user desires to protect.

BRIEF SUMMARY OF THE INVENTION

An object of the present invention is to provide a security device for all openings into an aircraft using a proximity sensor with two components attached in pairs on every opening into the aircraft with one of the pair of the proximity sensors on each side of each opening to protect the aircraft from security violations.

Another object of the present invention is to provide a way to protect aircraft from theft of its contents and components, including engines and accessories, avionics, and pilot supplies, as well as personal items stored within the aircraft such as luggage, keys, wallets and other valuable items the user desires to protect.

One more object of the present invention is to provide an inexpensive yet effective aircraft alarm system using available technology and components which would be structured, assembled and specifically configured for use in aircraft to protect all of the openings into the aircraft.

In brief, the system of the present invention utilizes a simple control box, which may be powered by the aircraft battery or electrical system or an independent battery dedicated to the alarm system which could either be connected to the aircraft electrical system for charging or remain wholly independent. The control box has a miniature LED type remote indicator light to identify that the system is activated or armed.

The control box is connected via a pair of small wires to commercially available off the shelf miniature proximity sensors/switches that are normally closed-circuit, mounted in adjacent pairs to any entry point into the aircraft including the engine compartment, storage compartment, luggage area, or other accessible area the user desires to protect in addition to the cockpit. One of the pair of sensors is mounted on the moveable opening and the other on the body of the aircraft. When an access area (whether a door, panel, window, canopy or other access area) is moved, opened, or otherwise accessed, the sensors/switches detect that the specific access point has been violated, opened, moved or otherwise manipulated. This causes the control box to sense the violation and trigger a siren/horn unit mounted in the cockpit or any other convenient place in the aircraft, to issue a high decibel and high pitched alarm continuously and indefinitely until the user disarms the system.

The system is armed via a wireless key fob/remote control with 2 buttons, "Arm" to arm the system and "Off" to disarm the system. When the "Arm" button on the remote control is pressed, the miniature LED light flashes or illuminates and the siren or horn annunciates a short audible "beep/chirp" pattern to identify that the system is armed. Likewise, when the "Off" button on the remote control is pressed, the siren/horn also annunciates a "beep/chirp" pattern to indicate the system is now disarmed and off.

An advantage of the present invention is that it provides a security device for all openings into an aircraft using a proximity sensor with two components attached in pairs on every opening into the aircraft with one of the pair of the proximity sensors on each side of each opening to protect the aircraft from security violations.

Another advantage of the present invention is that it provides an inexpensive yet effective aircraft alarm system using available technology and components which would be structured, assembled and specifically configured for use in aircraft to protect all of the openings into the aircraft.

An additional advantage of the present invention is that it provides a way to protect aircraft from theft of its contents and components, including engines and accessories, avionics, and pilot supplies, as well as personal items stored within the aircraft such as luggage, keys, wallets and other valuable items the user desires to protect.

Still another advantage of the present invention is that it is easy to operate by remote control.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

Figure 1:
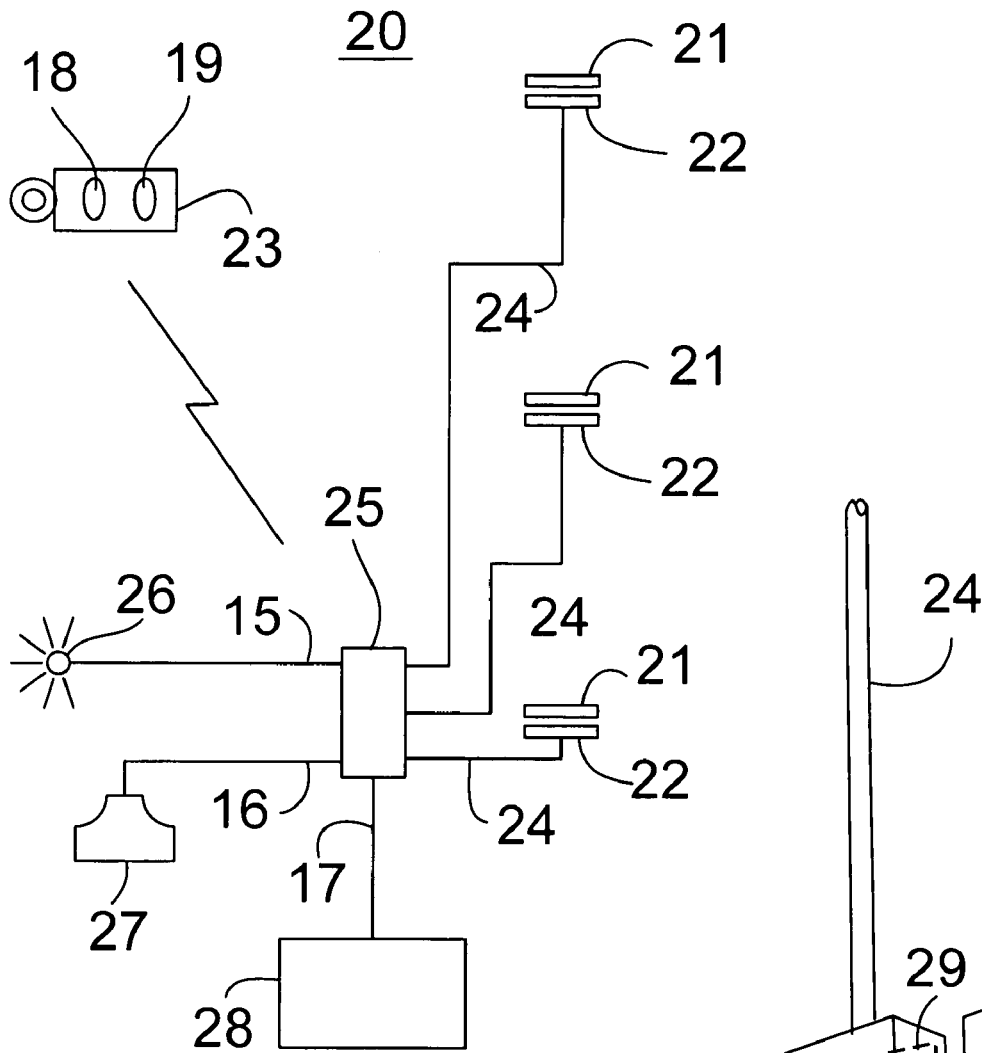
FIG. 1 is a diagrammatic view of the electric circuit of the small aircraft alarm security system of the present invention.
Figure 2:
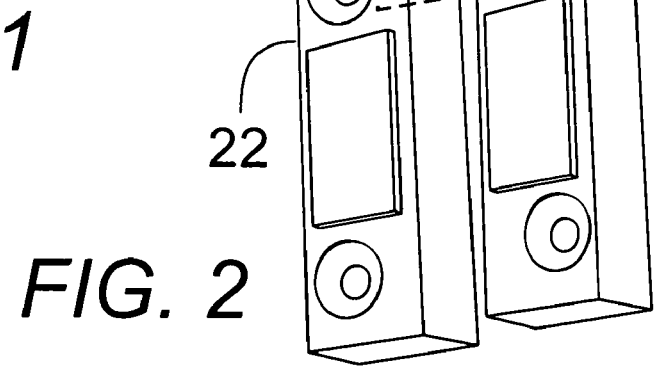
FIG. 2 is a perspective view of a pair of the proximity sensors of the present invention.
Figure 3:
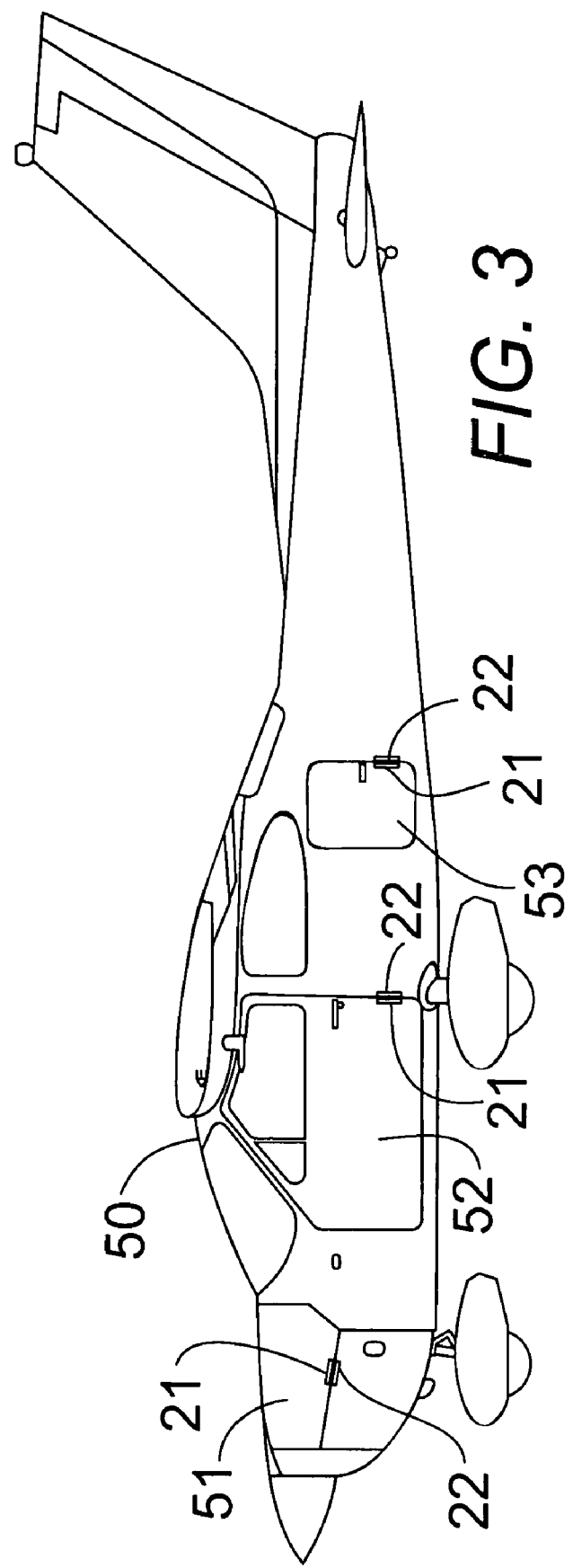
FIG. 3 is a side elevational view of an aircraft showing the proximity sensors of the present invention positioned at each of the openings into the body of the aircraft.

In FIGS. 1-3, an alarm security system 20 for small aircraft 50 protects all openings 51, 52, and 53 into the aircraft.

In FIG. 1, a control box 25 is powered by an electrical source of power, such as a battery 28 attached to the control box by an electrical connector such as wire 17. It may be a battery normally used in the aircraft or a battery independent of an aircraft electrical system. The battery may be rechargeable by the aircraft engine.

A remote control mechanism 23 has an activation or "on" button 18 and a de-activation or "off" button 19 that communicate with the control box for activating and deactivating the system. In a preferred embodiment, the remote control comprises a wireless combined key fob and remote control with at least two buttons including the on and off buttons.

A remote indicator light 26, such as a light emitting diode (LED), is connected to the control box by an electrical connector, such as wire 15, the indicator light being turned on when the system is turned on and the indicator light being turned off when the system is turned off.

A noise making device 27, such as a high decibel siren/ horn, is connected to the control box by an electrical connector, such as wire 16. When the system is armed, the siren/horn will annunciate a short audible "beep/chirp" pattern to identify that the system is armed. Likewise, when the "off" button is depressed on the remote control, the siren/horn will also annunciate a "beep/chirp" pattern to indicate the system is now disarmed and off.

In FIGS. 1, 2, and 3, the system has a series of pairs of proximity sensors 21 and 22. Each pair is made up of two elements, at least one of which has a means to detect a proximal relationship with the other of the pair of proximity sensors and a proximity sensor electrical switch 29 that communicates with the means to detect a proximal relationship. The proximity sensor 22 with the electrical switch 29 is positioned on the body of the aircraft and is connected by an electrical connector, such as wire 24, to the control box 25.

In FIG. 3, at least one of the pairs of proximity sensors 21 and 22 is positioned at each opening into an aircraft body 50 that has a movable opening cover, such as the engine compartment hood 51, the cockpit door 52, a movable window of a cockpit, a luggage or storage door 53, a canopy over an opening of the aircraft, and other accessible areas the user desires to protect. The first proximity sensor 21 of the pair of proximity sensors is attached to an edge of the movable opening cover adjacent to the opening, and the second proximity sensor 22 of the pair of proximity sensors is attached to the body of the aircraft adjacent to the opening and adjacent to the first proximity sensor, so that moving the opening cover to expose the opening causes a distancing between the pair of proximity sensors and activates the proximity sensor switch 29 to signal the control box 25 to activate the noise making device 27, making a continual alarm noise as long as the system is activated.

In use, after activation, when any access area (whether a door, panel, window, canopy or other access area) is moved, opened, or otherwise accessed, the proximity sensor in that area will detect that the specific access point has been violated, opened, moved or otherwise manipulated and the proximity sensor switch will cause the main control box to activate the alarm to issue a high decibel and high pitched alarm from the siren/horn unit (mounted either in the cockpit or any other convenient place in the aircraft) that will sound continuously and indefinitely unless and until the user presses the deactivate or "off" button on the remote control, thereby disarming the system.

It is understood that the preceding description is given merely by way of illustration and not in limitation of the invention and that various modifications may be made thereto without departing from the spirit of the invention as claimed.

What is claimed is:

1. An alarm security system for small aircraft to protect all openings into the aircraft, the system comprising:

a control box powered by an electrical source of power secured within a body of an aircraft, the electrical source of power taken from the list of sources of power including a power source for the aircraft, a separate power source, and a combination of the aircraft power source and a separate power source;

a remote control mechanism communicating with the control box for activating and deactivating the system;

a remote indicator light on the body of the aircraft visible from outside of the aircraft, the remote indicator light connected to the control box by an electrical connector, the indicator light being turned on when the system is turned on and the indicator light being turned off when the system is turned off;

a loud noise making alarm signal device in the aircraft body audible from outside the aircraft body connected to the control box by an electrical connector:

a series of pairs of proximity sensors each of the pairs comprising two elements at least one of which has a means to detect a proximal relationship with the other of the pair of proximity sensors and a proximity sensor electrical switch communicating with the means to detect a proximal relationship, the electrical switch connected by an electrical connector to the control box, at least one of the pairs of proximity sensors positioned at all openings into the aircraft body, the openings into the aircraft body taken from the list of openings including cockpit doors, cockpit windows, engine compartment openings, and storage compartment openings, each of the openings having a movable opening cover, with a first proximity sensor of the pair of proximity sensors attached to an edge of the movable opening cover adjacent to the opening and a second of the pair of proximity sensors attached to the body of the aircraft adjacent to the opening and adjacent to the first proximity sensor so that moving the opening cover to expose the opening causes a distancing between the pair of proximity sensors to activate the proximity sensor switch to signal the control box to activate the noise making device to make a continual alarm noise as long as the system is activated, thereby providing an alarm security system for small aircraft to protect all openings into the aircraft.

2. The system of claim 1 wherein a first of a pair of proximity sensors is attached to a door of a luggage compartment of the aircraft and a second of the pair of proximity sensors is attached to a body of the aircraft adjacent to the first of the pair of proximity sensors.

3. The system of claim 1 wherein a first of a pair of proximity sensors is attached to a canopy over an opening of the aircraft and a second of the pair of proximity sensors is attached to a body of the aircraft adjacent to the first of the pair of proximity sensors.

4. The system of claim 1 wherein the remote control comprises a wireless combined key fob and remote control with at least two buttons including a system activating button and a system de-activating button.

* * * * *